United States Patent [19]

Kärcher

[11] Patent Number: 4,502,567

[45] Date of Patent: Mar. 5, 1985

[54] PROGRESSIVE LIQUID DISTRIBUTOR

[76] Inventor: Alfred Kärcher, Caixa Postal 18.908, BR-0 1000 Sao Paulo, S.P., Brazil

[21] Appl. No.: 479,566

[22] Filed: Mar. 28, 1983

[30] Foreign Application Priority Data

Apr. 5, 1982 [BR] Brazil ................................ 8201989

[51] Int. Cl.³ .......................... F01M 1/06; F16N 25/02
[52] U.S. Cl. ................................ 184/7.4; 137/624.14
[58] Field of Search ................. 184/7.1, 7.4; 137/624.14

[56] References Cited

U.S. PATENT DOCUMENTS

| | | | |
|---|---|---|---|
| 3,409,104 | 11/1968 | Acker et al. | 184/7.4 |
| 3,476,214 | 11/1969 | Callahan | 184/7.4 |
| 3,653,466 | 4/1972 | Fujita et al. | 184/7.4 |
| 3,783,973 | 1/1974 | Kürten et al. | 184/7.4 |
| 4,105,094 | 8/1978 | Callahan | 184/7.4 |
| 4,186,821 | 2/1980 | Wegmann | 184/7.4 |
| 4,312,425 | 1/1982 | Snow et al. | 184/7.4 |

Primary Examiner—David H. Brown
Attorney, Agent, or Firm—McGlew and Tuttle

[57] ABSTRACT

A progressive distributor device for a liquid medium, particularly a lubricant, operating with a recurrent working cycle, comprising a plurality of distributors each having a housing and at least three consecutively displaceable working pistons mounted in cylinders of each housing and extending in parallel, the distributors being juxtaposed and hydraulically connected to each other in a manner so that for the working cycle, a first working piston of a first one of the distributors controls a second working piston of a last one of the distributors, and a first working piston of the last distributor controls a second working piston of a next to the last one of the distributors, a second working of each of the distributors connected to control a third piston of another distributor, with the third piston controlling a fourth piston of its distributor.

10 Claims, 8 Drawing Figures

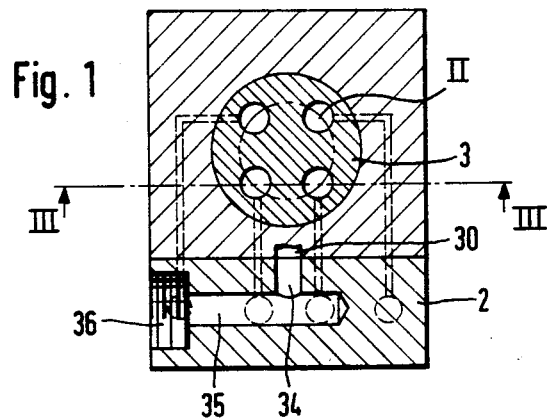
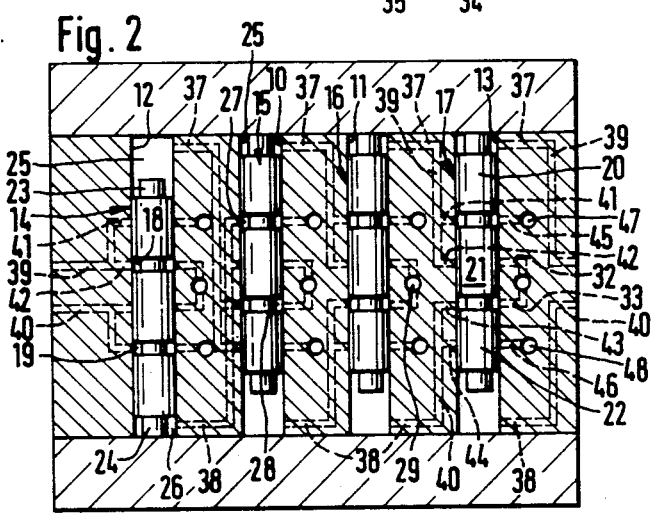
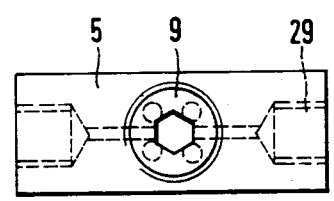
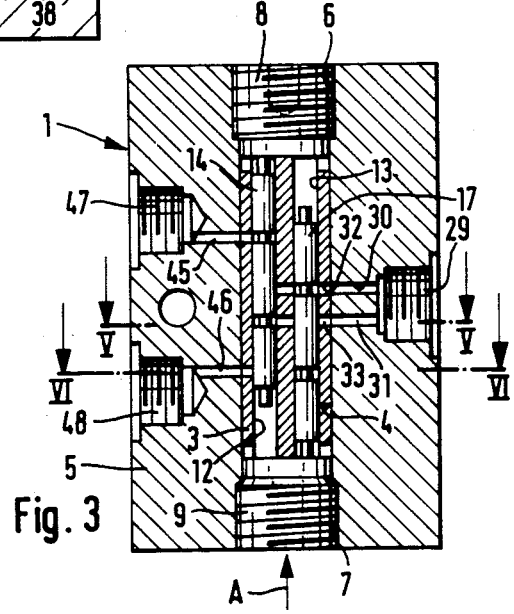

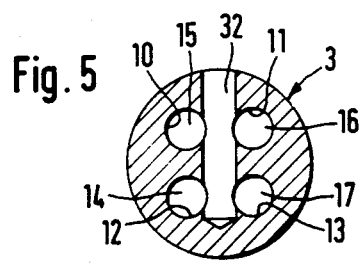
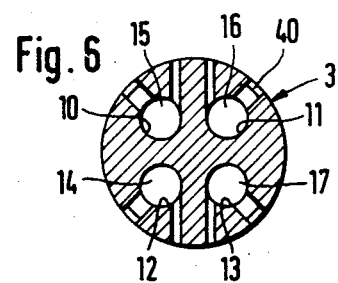
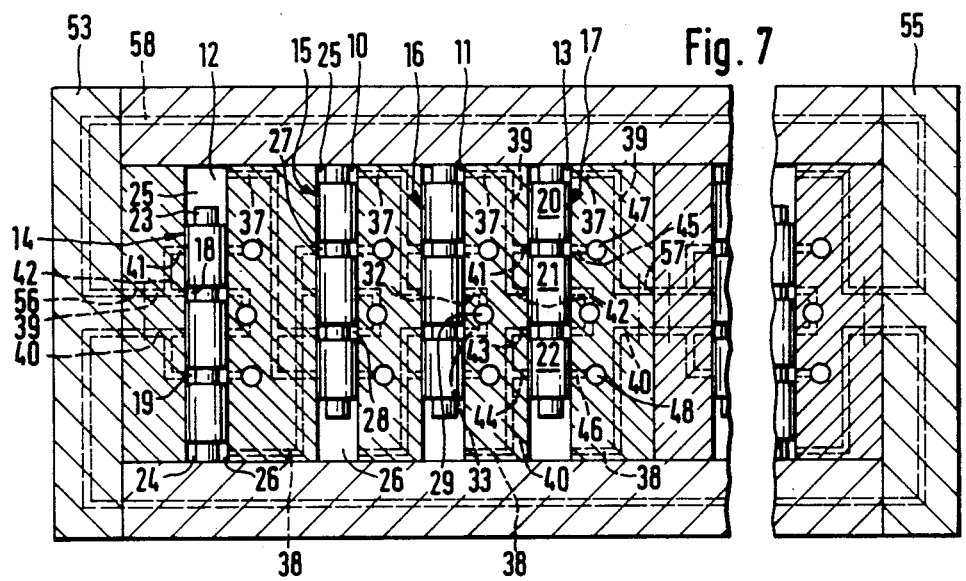
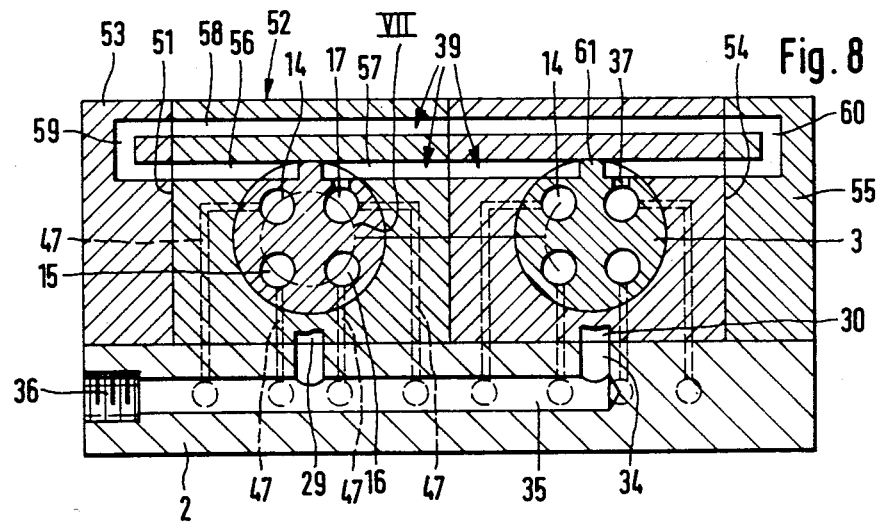

PROGRESSIVE LIQUID DISTRIBUTOR

FIELD AND BACKGROUND OF THE INVENTION

The present invention relates in general to liquid distributors and in particular to a new and useful progressive distributor device for a liquid medium which includes a housing for receiving a plurality of movable pistons which operate in a working cycle to discharge liquid.

Progressive or piston distributors of this kind are employed in various industries. If lubricant distribution is needed, the distributor's purpose is to feed the lubricant to a point of lubrication, such as an engaged tooth of a transmission, at a given time and in the necessary amount. The substance is supplied to the progressive distributor under pressure, and this pressure is at the same time used for displacing floating pistons in the distributor. While displacing such a piston from one of its end postions into the other, the lubricant or other substances present in the respective cylinder space is expelled by the leading end of the piston. The amount displaced per working stroke of the piston into the conduit leading to a point of use thus demands on the stroke length and the piston diameter. The pistons act both as working pistons and as control pistons. As a rule, the substance displaced under pressure by the first piston is conducted to flow to, and displace, a second piston. The second piston controls the motion of the third piston in the same way, and so on. As soon as the last piston, after the others, has performed its motion, for example, downwardly, it reverses the control to the effect of now moving the first piston upwardly, for example, and thus to displace the lubricant present at the other end of the piston. Such progressive or piston distributors thus act substantially as metering pumps. With a proper arrangement of the control passages of the piston and the housing, the working cycles uphold themselves automatically as long as lubricant under pressure is supplied. It follows from the foregoing that, for example, two points of use may be supplied with the liquid substance, namely one during the upward motion of the piston and the other during the downward motion thereof. If three pistons are provided, six points of use may be supplied, for example, except that two or more discharge lines at one end of the pistons would be united or branched. It therefore depends on the specific application how may pistons are provided in such a distributor.

Since the various end spaces and annular spaces in the cylinders must be hydraulically connected to each other, as already mentioned, in a way which insures that with a continuing supply pressure the working cycle will continue and automatically recur, the hydraulic connections, mostly designed as internal passages, of a progressive distributor become more complicated, the more pistons the distributor has. The result is that in practice, any number of pistons cannot be provided. Typically, such a progressive distributor will comprise four to six pistons, for example. This also necessarily determines or limits the number of discharge bores of such a progressive distributor.

There are applications, particularly in the lubricating technique, requiring a supply of the liquid substance or lubricant to a great number of locations. This problem can no longer be solved by branching the discharge line, particularly if only a definite amount per working stroke is available and a plurality of points of lubrication are to be supplied simultaneously with this, or even a larger amount. Such problems can be solved only by providing a plurality of progressive distributors. Each of them must be connected to a supply line and separately mounted. In addition, the various discharge lines must be laid. This is considerably expensive, already in the manufacture of the distributors, and because of the space needed.

SUMMARY OF THE INVENTION

A first object of the present invention is to further develop a progressive distributor of the above mentioned kind, and adapt it for solving even more extensive problems of distributing the fluid, in terms of manufacture, mounting, occupied space and cost.

In prior art progressive distributors of this kind, the pistons, for example three of them, are arranged side by side in a row. This gives a distributor a lengthwise configuration and requires a corresponding space. Moreover, the various passages, especially those connecting the last piston with the first one, are relatively long. This is expensive, since the passages are narrow bores.

Another object of the invention therefore is a further development of the distributor to make it as compact as possible, in order to minimize the cost of producing the various connecting passages and bores.

Accordingly, a further object of the invention is to provide a progressive distributor device for a liquid medium, particularly a lubricant, operating with a recurrent working cycle, comprising a plurality of distributors each having a housing and at least three consecutively displaceable working pistons mounted in cylinders of each housing and extending in parallel, said distributors being juxtaposed and hydraulically connected to each other in a manner so that for the working cycle, a first working piston of a first one of said distributors control the second working piston of a last one of said distributors, and a first working piston of said last distributor controls a second working piston of a next to the last one of said distributors, a second working piston of each of said distributors connected to control a third piston of another distributor, with said third piston controlling a fourth piston of its distributor.

The individual distributors are of such design, that 2,3,4 or even a substantially larger number of them can be assembled into a battery, i.e. they are capable of forming distributor batteries of any size, without requiring an adaptation to such a size. This makes possible a certain standardization and thus manufacture in substantially larger numbers and at lower cost. The storage requirements are also considerably reduced. Also repairs become simpler and quicker. For example, if a piston in a large battery fails, it suffices to replace the respective progressive distributor, and there is no need for removing the entire distributor battery. Repair costs are thereby quite considerably reduced. Further, such a distributor assembly may, at anytime, be enlarged as desired. To simplify the description, the term "lubricant distributor" or "lubricant" is employed hereinafter, without the intention of thereby introducing a limitation on the type of fluid or type of distributor covered by the invention.

The individual distributors are hydraulically coupled to one another in a suitable manner, and are most advantageously directly juxtaposed, to minimize the space needed. With an ingenious design, connecting lines between the individual distributors of the battery may be saved, only proper seals must be provided between the distributors. Limits are set on the size of such a battery by the internal resistance to flow, for example, which must not exceed a value which would prevent a control of the first distributor by the last one.

A particularly preferred embodiment of the invention provides for each piston to be shaped with a neck at either end to maintain upper and lower end spaces in each cylinder, and with two circular grooves to form upper and lower annular spaces of the piston, the upper annular space of the first piston of each distributor being associated with a first connecting passage leading to a first housing junction surface, and the upper end space of the second piston being associated with a second connecting passage which is aligned with the first passage and leads to a second housing junction surface which is parallel to the first surface. A third connecting passage is provided which extends in parallel with the aligned connecting passages between the first and the second housing junction surfaces, with end parts adjoined to the first and last distributors respectively. Each distributor having a return passage for establishing hydraulic communication between the ends of the connecting passages, with the lower end spaced and annular spaces of the pistons being hydraulically connected in a corresponding manner. If in such an assembly, the second housing junction surface of every left-hand distributor is joined to the first housing junction surface of the next distributor at the right, the three passages as well as the upper and lower end spaces and annular spaces are hydraulically correctly associated with each other. Upon juxtaposing the desired number of distributors in the described manner, with the mentioned hydraulic passages connecting with each other, the first end part is connected from the left to the first distributor and the second end part is connected from the right to the last distributor, so that the passages of hydraulic communication become closed in themselves. This ensures that independently of the number of distributors forming the battery, all the pistons of the battery will consecutively execute a working stroke in one direction, and that, after the displacement of the last piston, the movements will be reversed, so that consecutive working strokes in the opposite direction will follow. There is a prerequisite, however, that each individual distributor will be hydraulically designed to perform a continuously recurring cyclic work if only alone connected to the two end parts. A development of the invention provides that the distributors are placed on a common base plate which has a connection for a pressure supply line and a main supply passage communicating with, a distributing passage being branched from the main supply passage to each distributor, which distributing passage is hydraulically connected to one of the two annular spaces of each of the pistons. With this design, a single pressure supply line is needed, and the supply is branched in the interior of the base plate, and then also within each of the distributors of the battery, to feed the pressurized fluid to the individual cylinder spaces in a manner necessary for maintaining the working cycles.

In another embodiment of the invention, it is provided that the pistons of each distributor are mounted in a cylinder insert which forms a first housing part and is tightly fitted in a cavity of a corresponding cross section of a second housing part with the axes of the pistons being arranged to either mark corners of a polygon or line in at least two rows. Such a design leads to a particularly inexpensive manufacture while preserving compact construction at the same time. The particular advantage is, however, that the passage connecting one annular space to the other or to an end space and inversely, can be provided in the joint between the tightly fitting surfaces of the cylinder insert and the second housing part. For example, grooves may be provided, preferably in the surface of the insert, which are then covered by the opposite surface of the housing part and form flow passages. In addition, supply and discharge conduits can then be combined in a simple way by a specific arrangement of the pistons within the insert.

Still another embodiment of the invention provides that each distributing passages forks to form two passages of inflow bores with each inflow bore extending substantially perpendicularly to a longitudinal axis of the cylinder insert, and intersecting about tangentially all of the cylinders accommodating the pistons of the insert. This not only shortens the flow passages and thus reduces resistance to flow, but also simplifies the making of these passages. This simplification is made possible by the particular arrangement of the pistons in the cylinder insert.

A further embodiment of the invention provides that each distributor had a discharge bore for each piston cylinder which opens into a housing surface of an adjacent distributor and applies against the base plate, the base plate having passages which are aligned therewith and lead to a connection for a discharge line. The discharge bores leading from the various cylinder spaces may be united by twos or in larger numbers, provided this does not affect the working cycle. Such a combination must be provided within the cylinder insert and/or in the surrounding housing part.

To solve the second problem mentioned above, it is provided, in accordance with the invention, and in a piston distributor as set forth to solve the first problem, by providing that the cylinder insert forming the first housing part is tightly fitted to the cavity of the second housing part, with the piston axes forming the corners of a polygon or lying in at least two rows. Since in such a distributor, the pistons are no longer arranged in a row, but, for example, in a triangular, quadrangular, or polygonal configuration, or at least partly in at least two rows, such as six in two rows, the housing can be made substantially shorter (the last mentioned case results in half the housing length), so that a desired more compact construction is obtained. A short housing then means short flow passages which are simpler to make. The flow passages may still be simplified and made less expensive, at least partly, by designing the housing in two parts, as mentioned, so that the various flow passages may be provided in the joint between the two housing parts. They are then formed partly by one and partly by the other housing part. For various reasons, but particularly because of the necessary supply and discharge passages, an arrangement of the piston axes in a symetrical form thus in an equilateral triangle, a square or an equilateral pentagon, for example, is not necessarily advantageous. Also, it may be more advantageous to arrange the pistons in two rows of three, rather than in a hexagon.

A development of the invention provides that the cylinder insert is press fit or force fit into the second housing part. Such a force fit results in a satisfactory tightness between the two housing parts, without the necessity of further sealing, such as with seal rings.

Depending on the circumstances, the cylinder insert may be secured in the second housing part in addition against axial displacement by means of plugs screwed in from both sides. The inner end face of such a plug may then advantageously serve the purpose of closing the associated end spaces in the cylinder and thus define the height thereof, considered in the piston direction. With a shrink fit or press fit, a circular cylindrical shape is particularly suitable.

Another development of the invention provides that, to form inflow and discharge passages to and from the piston cylinders, the cylinder insert includes radial bores which open, at least partially, into grooves provided in the outer surface of the insert, with transverse bores of second housing part communicating with at least one of the transverse bores and the grooves of the cylinder insert to permit the uninterrupted flow. Both the transverse, particularly radial, bores and the grooves which, if longitudinal grooves are concerned, preferably are shorter than the cylinder insert, can be made in a simple and inexpensive way. For example, the grooves may be made by investment casting, so that any finishing work is unnecessary.

In still another development of the invention, it is provided that at least one of the inflow and discharge bores of the cylinder insert directly hydraulically communicates with one of the inflow and discharge bores of the second housing part, and extends substantially perpendicularly to a longitudinal axis of the cylinder insert and intersects substantially tangentially, at least two of the piston cylinders. If, with four pistons, this bore is to tangentially intersect with all of the four cylindrical bores accommodating the pistons, and the piston axes are in square arrangement, the diameter of the transverse bore is given by the spacing of the piston axes from each other, by the diameter of the pistons and by the radial depth of intersection.

It follows therefrom that it may be quite desirable to arrange the four axes not in a square but in a rectangle, in order to be able to provide a simple cross bore of larger or even smaller, diameter partly intersecting with all of the cylindrical bores. For the same reason, if three pistons are provided, it may be preferable to arrange them in an isosceles, not equilateral, triangle. Further, with six cylinders, two rows of three bores might be preferable to a hexagonal arrangement. However, if a symmetrical hexagon is desired, two and two adjacent cylindrical bores may be intersected by a cross bore, so that altogether three crossbores will be needed in every plane. It is possible, of course, to provide a hydraulic supply into each piston cylinder through a separate crossbore. With a working fluid however, this may be advisable only in special cases, since with a discharge of such a fluid, each cylindrical bore of a piston is hydraulically connected to a further connecting outflow passage through a crossbore of its own, in each plane.

A further object of the invention is to provide a progressive distributor device which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the following, further particulars and advantageous developments of the invention are explained in more detail with reference to the accompanying drawings in which:

FIG. 1 is a simplified and partly diagrammatical sectional view taken perpendicularly to the piston axes of a progressive distributor;

FIG. 2 is a diagrammatical development of the progressive distributor according to FIG. 1, taken along a circle II passing through the piston axes and not quite to scale;

FIG. 3 is a diagrammatical sectional view of a progressive distributor of the kind according to FIG. 1, with four pistons taken in a plane III passing through the axes of the two pistons;

FIG. 4 is a view taken in the direction of arrow A of FIG. 3;

FIG. 5 is an enlarged sectional view taken along the line V—V of FIG. 3 of the cylindrical insert;

FIG. 6 is a view similar to FIG. 5 and taken along the line VI—VI of FIG. 3;

FIG. 7 is a diagrammatical development of the distributor taken along a circle VII passing through the axes of the pistons of FIG. 8, with at least two, but generally a plurality of distributors being connected hydraulically and mechanically into a battery; and FIG. 8 is a simplified, partly diagrammatical sectional view perpendicular to the piston axes of a distributor battery comprising two progressive distributors according to FIG. 7.

DESCRIPTION OF THE PREFERRED EMBODIMENTS

Referring to the drawings in particular, the invention embodied therein comprises a progressive distributor device formed of a plurality of distributors each having a plurality of pistons movable therein.

Every progressive distributor of the inventive distributor battery comprises a housing 1 (FIG. 3) including at least two parts. Two, three, or even more identically designed progressive distributors of this kind may be combined into distributor battery and they are then advantageously mounted on a common base plate 2 (FIG. 8). In any case, the housing of each of the progressive distributors includes a cylinder insert 3 forming a first housing part, and a second housing part 5 which is provided with a cavity 4 for insert 3.

If the cylinder insert has a circular cross section, as in the shown examples, the cross section of cavity 4 is circular too, of course. Cylinder insert 3 is shorter than second housing part 5 so that two screw plugs 8, 9 may be screwed from the two front sides into tap holes 6,7 of housing part 5, to prop the associated front ends of cylinder inserts 3. The inside end faces of these screw plugs 8, 9 form at the same time closing surfaces for cylindrical bores 10 to 13 which are provided in insert 3. Cylinder insert 3 is preferably shrink fitted in cavity 4 of second housing part 5. This saves special packings at the joint between insert 3 and part 5, which would otherwise be needed to prevent the lubricant from finding an undesirable way from one passage or bore to another. The sectional view of FIG. 3 is taken through the center of cylinder insert 3, only, for reasons of clarity, the contours of bores 12 and 13 are shown in solid lines.

The axes of the four piston 14 to 17 mark corners of a rectangle, particularly a square. They extend symmetrically of the axis of cylinder insert 3 (FIG. 1).

Each piston is designed with two circular grooves 18, 19 by which it is subdivided into three portions 20, 21 and 22, particularly of equal length. On either of its ends, each piston is provided or in particular, formed with a neck 23, 24. The diameter of the neck corresponds to that of the piston in the zones of circular grooves 18, 19. With neck elements 23, 24 considered as upper and lower necks, respectively, the associated cylinder spaces within insert 3 may be designated upper end space 25, and lower end space 26. Consequently, in the showing of FIG. 7, piston 14 would be in its lower end positions. The annular spaces dividing the pistons into the three equal portions are designated 27 and 28, with 27 being the upper annular space and 28 the lower one.

To manage with a single lubricant supplying pressure line for each progressive distributor and with a common supply line for the distributor battery, each distributor, in the shown example, has a single lubricant supply connection 29. Two radial bores 30, 31 extend therefrom in two spaced-apart planes. Their spacing corresponds to the median spacing of two annular spaces 27, 28, minus the maximum stroke of a piston. In consequence, the further extending radial bores 32 and 33 in insert 3, which are aligned with radial bores 30 and 31, connect, or are connectable either to annular spaces 27 or to annular spaces 28 of the four pistons, depending on the instantaneous end position of the pistons. A simultaneous connection to all four pistons or annular spaces thereof is obtained due to the provision that the farther extending radial bores 32 and 33 intersect with all four bores 10 to 13, as shown in FIG. 5. If a distributor battery is concerned, the outer ends of radial bores 30, 31 of each distributor advantageously hydraulically communicate each with an aligned further crossbore 34 provided in, and opening into, a lengthwise bore 35 of base plate 2. The two lengthwise bores 35 then open in a manner shown in FIG. 8, into a common lubricant connection 36. The design, however, may also be in accordance with FIG. 3, namely that a united connection 29 communicates with the crossbore.

In FIG. 7, the common lubricant connection 29, or a corresponding common bore for supplying the pressurized lubricant, is shown as four separate conduits, for reasons of clarity, and the same applies to the two further conducting radial bores 32, 33 of cylinder insert 3. By displacing a piston, as already mentioned, the lubricant present in the respective end space 25 or 26 ahead of the piston is displaced too. It flows first in the radial direction outwardly, through bores designated 37, 38 in FIGS. 7 and 8. These bores are followed by groove-like flow passages 39,40 which extend in the outer surface of cylinder insert 3, particularly in the circumferential and lengthwise directions, to hydraulically connect to two radial bores 41,42 or 43, 44 provided in insert 3 and leading at spaced apart levels of the adjacent pistons. Radial bores 41,42 or 43,44 are so located that in the end position of the piston one of them is always aligned with one of the annular spaces 27,28, depending on which of the end positions has been reached. In such a position, still another radial bore 45, 46 opens into the respective annular space, which radial bore is connectable to a discharge line leading to a point of use. In FIG. 8, three hydraulic connections are shown diagrammatically and in FIGS. 3 and 6, they are shown in a somewhat simplified manner. In instances where the distributor is not employed individually as according to FIG. 3, but in a battery, discharge passages 47, 48 may extend as diagrammatically shown in FIG. 8. Then, in a manner similar to lengthwise bore 35, discharge passages 47, 48 are united in separate lengthwise bores provided in the base plate, and connected to the outside. In this way, discharge passages 47 of all the distributors may be combined to groups, for example, which are connected through common discharge lines each to a point of use. The same applies to discharge passages 48.

The upper end spaces 25 at pistons 15,16 and 17 communicate in the described manner with upper annular spaces 27. In a similar way, the lower end spaces 26 communicate with the lower annular spaces 28 of the three pistons. However, to ensure continuous working cycles, a "crossing connection" is provided, in the shown example between pistons 14 and 15. Due to this connection upper end space 25 at piston 14 hydraulically communicates with the lower annular space 28 of piston 15 while lower end space 26 at piston 14 hydraulically communicates with upper annular space 27 of piston 15.

With four pistons in their upper end positions, the working cycle of a distributor operates as follows:

The lubricant flows from connection 29 through lower annular space 28, flow passages 39, and radial bore 37 to upper end space 25 at piston 14 and displaces this piston into the lower end position thereof. This position is shown in FIG. 7. During its downward motion, piston 14 has displaced the lubricant, which was present in lower end space 26, through radial bore 58, flow passages 40, and upper annular space 27 of piston 15, toward outlet 47 of this piston.

Upper annular space 27 of piston 14 now hydraulically connected to lubricant supply connection 29, and flow passages 39 which hydraulically communicate with annular space 27 conducting the lubricant to upper end space 25 at piston 17, so that this piston also will be displaced downwardly to force the lubricant present in lower end space 26 through flow passages 40 and lower annular space 28 of piston 14 to the outlet 48 thereof. As soon as piston 17 reaches about its lower end position, the way of the lubricant to upper end space 25 at piston 16 is clear, so that piston 16 also moves downwardly and displaces the lubricant present in lower end space of cylinder 11. Finally, piston 15 now moves downwardly too. Because of the crossing connection with piston 14, the lubricant under pressure passes into lower end space at piston 14, so that this piston moves upwardly and displaces the lubricant present in the respective upper end space. Through lower annular space 28 of piston 14, the way for the pressurized lubricant to piston 17 is cleared, so that this piston also is moved upwardly again. Thereupon, piston 16 and 15, in this order, move upwardly and the working cycle is terminated. With a further supply of lubricant under pressure, the next working cycle starts immediately.

In FIG. 3, the two outlets 47, 48 for the lubricant amounts displaced by piston 17 during its motion up or down are shown somewhat schematically. In such a design, a progressive distributor with four pistons has 8 outlets with which 8 points of lubrication can be supplied, provided that none of the discharge lines are united or branched. As already mentioned, however, such discharge conduits may be united, either by twos or by fours, which may be done in a way analogous to that shown in FIG. 5.

The working cycle has been described in the foregoing as applied to the operation of a single distributor. This requires, however, to join a first end part 53 to the first housing junction surface 51 of this distributor 52, and a second end part 55 to the other side of distributor 52, namely to second housing junction surface 54, which is parallel to surface 51. This is an assemblage analogous to that shown in FIG. 8 for a battery. Pistons 14, 17 16 and 15 represent the first, second, third and fourth piston, in this order. The crossing connection is therefore provided between first piston 14 and fourth piston 15. All flow passages 39 and 40 between the second and third pistons as well as between the third and fourth pistons and between the fourth and first pistons are indicated in broken lines. Now, in a distributor suitable for being assembled to a battery, the flow passage 39 from first piston 14 to second piston 17 according to FIG. 8 comprises a first connecting passage 56 opening upwardly into first housing junction surface 51, a second connecting passage 57 aligned therewith which opens into second housing junction surface 54, and a third connecting passage 58 which is parallel to the two aligned passages and extends between the first and second housing junction surfaces. In addition, a first passage 59 is provided in first end part 53 to be applied to the first housing junction surface, and a second return passage 60 is provided in second end part 55. In a battery, the second end part applies to the second housing junction surface 54 of the last distributor, considering the distributor 52 shown in FIG. 8 at the left hand side as the first one and the distributor at the right hand end of a battery as the last one. Consequently, in a battery, all the third connecting passages extend in direct communication with each other, while of the first two connecting passages, only the second passage 37 of a distributor at the left hand side communicate directly with the first connecting passage 56 of the adjacent distributor next to the right.

As a result, the operation or working cycle of such a distributor battery is as follows:

The first piston 14 of a first distributor, i.e. the one at the left-hand side in the shown example, moves and thereby controls the second piston 17 of the last distributor, i.e. the one at the right-hand end in the shown example, to move in the same direction. Thereupon, consecutively, the third piston, the fourth piston, and the first piston of the last distributor work in the manner as described in connection with the single distributor. Then, the last named first piston controls the second piston of the next to the last distributor (counted from the right to the left). In this way, finally the second piston of the first distributor is also moved. As soon as the third and the fourth pistons of the first distributor have executed their strokes, the first piston of the first distributor is reversed, whereby the second half of the total working cycle of the battery is started.

Should it be desired to employ these distributors individually, with definitely no intention of forming a battery, the partitions 61 may be broken through at suitable locations, and one may dispense with passages 56, 57 and 58, as well as with the two end parts 53 and 55.

Advantageously, second housing parts 5 are firmly secured to one another by means of screws for which suitable holes must be provided (not shown) or by dovetail or similar connecting elements formed on the parts. The contacting surfaces must therefore be very well finished and the housing junction surfaces of each second housing part 5 must extend exactly parallel to each other. If necessary, sealing elements (not shown) are provided between adjacent housing parts.

While specific embodiments of the invention have been shown and described in detail to illustrate the application of the principles of the invention, it will be understood that the invention may be embodied otherwise without departing from such principles.

I claim:

1. A progressive distributor device for a liquid medium, particularly a lubricant, operating with a recurrent working cycle, comprising a plurality of distributors each having a housing and at least three consecutively displaceable working pistons mounted in cylinders of each housing and extending in parallel, the distributors being juxtaposed and hydraulically connected to each other in a manner so that for the working cycle, a first working piston of a first one of the distributors controls a second working piston of a last one of the distributors, and a first working piston of the last distributor controls a second working piston of a next to the last one of the distributors, a second working piston of each of the distributors connected to control a third piston of another distributor, with the third piston controlling a fourth piston of its distributor.

2. A device according to claim 1, wherein each piston is shaped with a neck on either end to maintain upper and lower end spaces in each cylinder, and with two circular grooves to form upper and lower annular spaces of the piston, the upper annular space (27) of the first piston (14) of each distributor being associated with a first connecting passage (56) leading to a first housing junction surface (51), and the upper end space (25) of the second piston (17) is associated with a second connecting passage (57) which is aligned with the first passage (56) and leads to a second housing junction surface (54) which is parallel to the first surface (51), a third connecting passage (58) being provided which extends in parallel with the the aligned connecting passages (56,57) between the first (51) and the second (54) housing junction surfaces, with end parts (53,55) adjoined the first and last distributors, respectively, each having a return passage (59,60) establishing hydraulic communication between the ends of the connecting passages (56,58) and (57,58), the lower end spaces (26) and annular spaces (28) of the pistons being hydraulically connected in a corresponding manner.

3. A device according to claim 2, wherein the distributors are placed on a common base plate (2) which has a connection (36) for a pressure supply line and a main supply passage (35) communicating therewith, a distributing passage (29) being branched from the main supply passage to each distributor, which distributing passage is hydraulically connectable to one of the two annular spaces (27,28) of each of the pistons.

4. A device according to claim 3 wherein each distributing passage (29) forks to form two passages of inflow bores (30,31,32, 33) with each inflow bore extending substantially perpendicularly to a longitudinal axis of the cylinder insert, and intersecting about tangentially all of the cylinders accommodating the pistons of the insert.

5. A device according to claim 3, wherein each distributor has a discharge bore for each piston cylinder which opens into a housing surface of an adjacent distributor and applies against the base plate (2), the base plate having passages which are aligned therewith and lead to a connection for a discharge line.

6. A device according to claim 3, wherein the pistons of each distributor are mounted in a cylinder insert (3) which forms a first housing part and is tightly fitted in a cavity of corresponding cross section of a second housing part (5), with the axes of the pistons being arranged to one of, mark corners of a polygon and lie in at least two rows.

7. A device according to claim 6, wherein the cylinder insert (3) and the cavity (4) have a circular cross-section, and that the insert (3) is one of press-fitted and shrink-fitted into a second housing part.

8. A device according to claim 5, wherein to form inflow and discharge passages to and from the piston cyliners, the cylinder insert (3) includes radial bores which open, at least party, into grooves provided in the outer surface of the insert (3), with transverse bores of the second housing part (5) communicating with at least one of the transverse bores and the grooves of the cylinder insert (3) to permit uninterrupted flow.

9. A device according to claim 5, wherein at least one of the inflow and discharge bores of the cylinder insert (3) directly hydraulically communicates with one of the inflow and discharge bores of the second housing part (5) and extends substantially perpendicularly to a longitudinal axis of the cylinder insert and intersects substantially tangentially, at least two of the piston cylinders.

10. A progressive distributor device comprising:
a base plate having a first mating surface, a plurality of discharge passages and at least one supply passage each ending at said first mating surface;
a plurality of distributor housings each having second mating surfaces mating with said first mating surface and third mating surfaces, said distributor housings connected in juxtaposed series arrangement across said base plate with third mating surfaces of adjacent distributor housings engaging each other, each distributor housing having a cavity with passages connecting said cavity with said discharge and supply passages of said said base;
a distributor insert tightly received in each of said cavities and including a plurality of parallel cylinders extending therein with passages communicating said cylinders with respective discharge and supply passages of said base plate through said distributor plate passages;
a piston movably mounted in each cylinder of each insert for moving between end positions, each piston having a plurality of neck portions defining annular upper and lower end spaces and upper and lower annular spaces, said passages of each insert communicating with said at least one supply passage also communicating with at least one of said upper and lower annular spaces, said passages in said insert communicating with said discharge passages of said base plate also communicating with at least one of said upper and lower end spaces; and
a pair of end parts each having a fourth mating surface mating with a third mating surface of a first one of said distributor housings in said series and a third mating surface of a last one of said distributor housings in said series respectively, each of said end parts including a return passage for establishing communication between at least two passages in each of said distributor housings.

* * * * *